United States Patent [19]
Suzuki

[11] Patent Number: 5,467,296
[45] Date of Patent: Nov. 14, 1995

[54] HIGH-SPEED SMALL DIGITAL MULTIPLIER

[75] Inventor: Makoto Suzuki, Tokyo, Japan

[73] Assignee: NEC Corporation, Tokyo, Japan

[21] Appl. No.: 251,050

[22] Filed: May 31, 1994

[30] Foreign Application Priority Data

Jun. 1, 1993 [JP] Japan ..................... 5-129857

[51] Int. Cl.⁶ ............... G06F 7/52; G06F 7/38; G06F 11/00
[52] U.S. Cl. ............ 364/754; 364/737; 364/745
[58] Field of Search ............... 364/715.04, 736, 364/736.5, 737, 757, 745, 754

[56] References Cited

U.S. PATENT DOCUMENTS

| | | | |
|---|---|---|---|
| 4,649,508 | 3/1987 | Kanuma | 364/748 |
| 4,722,066 | 1/1988 | Armer et al. | 364/745 |
| 4,945,507 | 7/1990 | Ishida et al. | 364/737 |
| 5,038,313 | 8/1991 | Kojima | 364/736.5 |
| 5,262,973 | 11/1993 | Richardson | 364/736 |

OTHER PUBLICATIONS

"Observation of Architecture for Multiplier in Parallel Processing Along LSI Technologies"; Nikkei Electronics, 1978; pp. 77–89.

*Primary Examiner*—Roy N. Envall, Jr.
*Assistant Examiner*—Chuong D. Ngo
*Attorney, Agent, or Firm*—Whitham, Curtis, Whitham & McGinn

[57] ABSTRACT

A digital multiplier absolutizes a multiplicand and a multiplier for decreasing component bits thereof, and multiplies the absolutized multiplicand by the absolutized multiplier for producing a product without a sign bit; the sign bits are produced from the multiplicand and the multiplier independent from the multiplication, and the sign bits are added to the data code indicative of the product; the component circuits for producing partial products are decreased, and the multiplication is speed-up.

4 Claims, 6 Drawing Sheets

Fig. 1
PRIOR ART

|   | $X_4$ | $X_3$ | $X_2$ | $X_1$ | ⇐ MULTIPLIER |
|---|---|---|---|---|---|
| ×) | $y_4$ | $y_3$ | $y_2$ | $y_1$ | ⇐ MULTIPLICAND |
|   | $X_4 y_1$ | $X_3 y_1$ | $X_2 y_1$ | $X_1 y_1$ | ⇐ PARTIAL PRODUCTS |
|   $X_4 y_2$ | $X_3 y_2$ | $X_2 y_2$ | $X_1 y_2$ | | | ⇐ PARTIAL PRODUCTS SHIFTED BY ONE BIT POSITION |
| $X_4 y_3$ $X_3 y_3$ | $X_2 y_3$ | $X_1 y_3$ | | | | ⇐ PARTIAL PRODUCTS SHIFTED BY TWO BIT POSITION |
| + $X_4 y_4$ $X_3 y_4$ $X_2 y_4$ | $X_1 y_4$ | | | | | ⇐ PARTIAL PRODUCTS SHIFTED BY THREE BIT POSITION |
| $P_8$  $P_7$  $P_6$  $P_5$  $P_4$  $P_3$  $P_2$  $P_1$ | | | | | | |

HIGH-SPEED SMALL DIGITAL MULTIPLIER

FIELD OF THE INVENTION

This invention relates to a digital multiplier and, more particularly, to a high-speed small digital multiplier operative on twos complements.

DESCRIPTION OF THE RELATED ART

Figure 1:
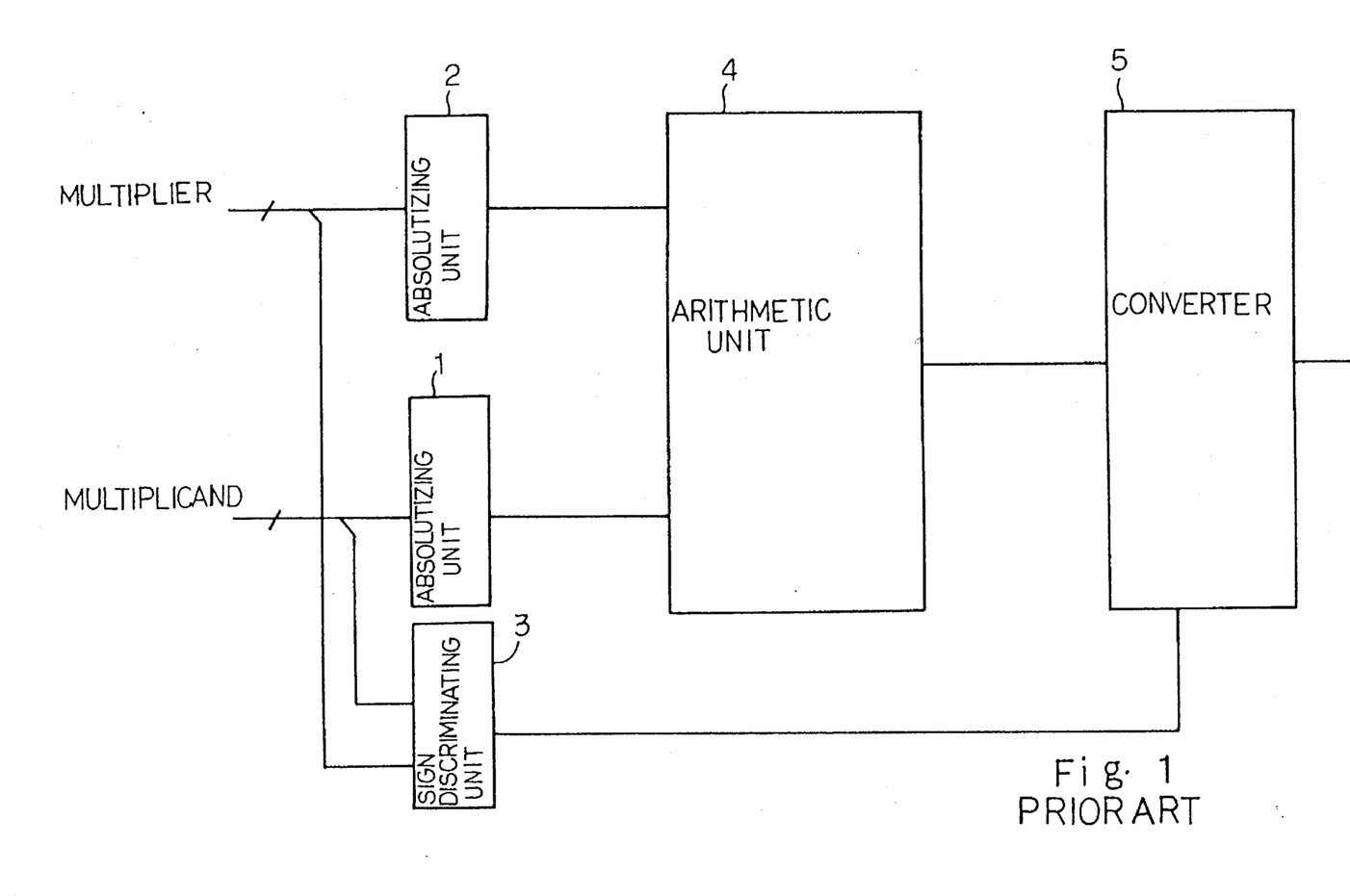
FIG. 1 is a block diagram showing the arrangement of the prior art multiplier.

A typical example of the multiplier is illustrated in FIG. 1 of the drawings, and handles two digital codes. The first digital code represents an m-bit twos complement, and serves as a multiplicand. The second digital code represents an n-bit twos complement, and serves as a multiplier. The prior art multiplier comprises two absolutizing units 1 and 2, a sign discriminating unit 3, an arithmetic unit 4 and a converter 5.

The asbolutizing units 1 and 2 absolutize the m-bit twos complement and the n-bit twos complement. If a twos complement is indicative of a positive value, the bits are not treated. However, if a twos complement represents a negative value, all of the bits are inverted, and "1" is added to the least significant bit.

In the twos complement representation, "0" is represented by the bit string 00 ... 0, and the addition of "1" to the bit string 00 ... 0 increments the value to "+1". On the other hand, the bit string 11 ... 1 represents the negative value "−1" and the subtraction of "1" from the bit string 11 ... 1 decrements the value to "−2". Therefore, two-bit codes 00, 01, 11, 10 represent value "0", "+1", "−1" and "−2", respectively, in the twos complement representation.

Using the above described process, the absolutizing units 1 and 2 convert the multiplicand and the multiplier from the twos complement representation to the absolutized representation. For example, a 4-bit digital code 1110 represents twos complement indicative of value "−2". The absolutizing unit 1 or 2 firstly inverts all the bits to 0001, and "1" is added to the least significant bit "0". Then, the twos complement indicative of "−2" is absolutized by the bit string 0010. On the other hand, a twos complement 0010 represents the twos complement indicative of value "+2" and the bit string 0010 also represents value "+2" in the absolutized representation.

Figure 2:
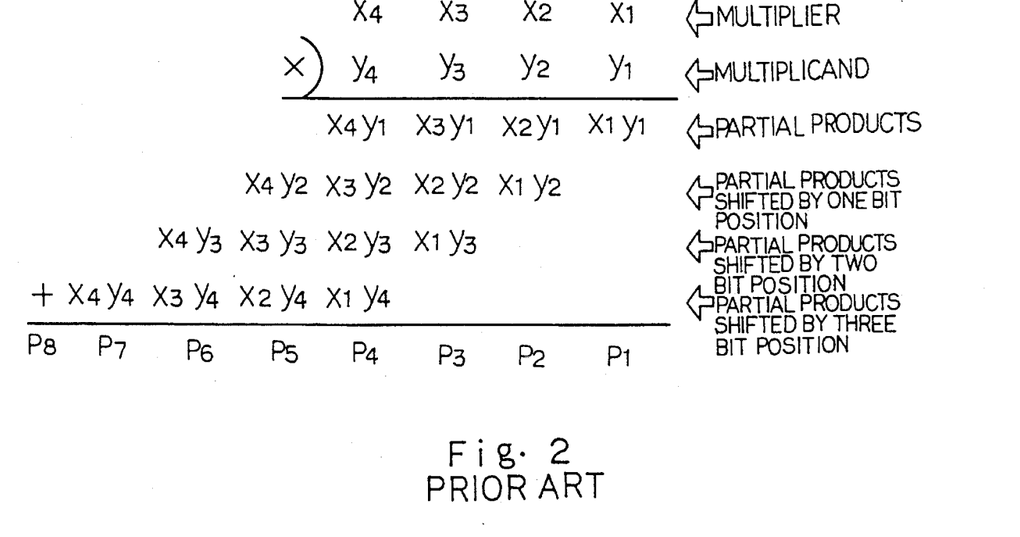
FIG. 2 is a view showing the multiplication carried out by the prior art multiplier.

The absolutized multiplicand and the absolutized multiplier are transferred to the arithmetic unit 4, and are treated as shown in FIG. 2. The multiplicand and the multiplier are assumed to be represented by the bit string x4x3x2x1 and the bit string y4y3y2y1. The arithmetic unit 4 firstly produces partial products x4y1/x3y1/x2y1/x1y1, partial products x4y2/x3y2/x2y2/x1y2, partial products x4y3/x3y3/x2y3/x1y3 and partial products x4y4/x3y4/x2y4/x1y4, and, thereafter, the partial products x4y2/x3y2/x2y2/x1y2, the partial products x4y3/x3y3/x2y3/x1y3 and the partial products x4y4/x3y4/x2y4/x1y4 are shifted one bit position, two bit positions and three bit positions. As a result, the partial products are properly weighted. Finally, the arithmetic unit 4 adds the partial products, and produces a true product p8p7p6p5p4p3p2p1p.

Figure 3:
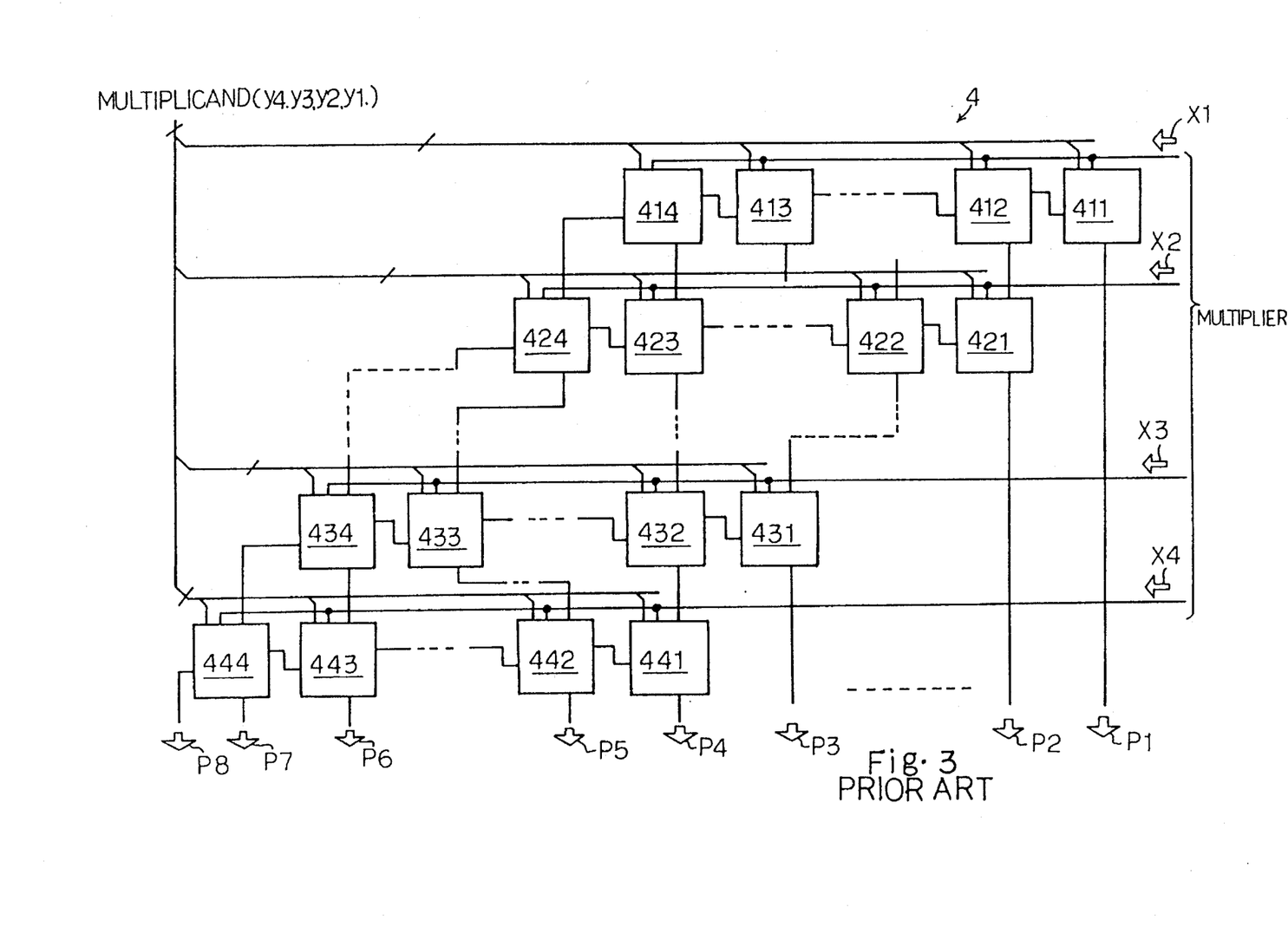
FIG. 3 is a block diagram showing the arrangement of the arithmetic unit incorporated in the prior art multiplier.

The arithmetic unit 4 is implemented by an array of calculating sub-units 411 to 414, 421 to 424, 431 to 434 and 441 to 444 as shown in FIG. 3, and the rows of calculating sub-units 411-414/421-424/431-434/441-444 are sequentially offset so as to properly weight the partial products. Each of the calculating sub-units 411 to 444 comprises an AND gate AD1 and an adder ADD1, and the bits x1, x2, x3 and x4 are respectively supplied to the rows of calculating sub-units 411-414/421-424/431-434/441-444, and the bits y1, y2, y3 and y4 are respectively distributed to the columns of calculating sub-units.

Figure 4:
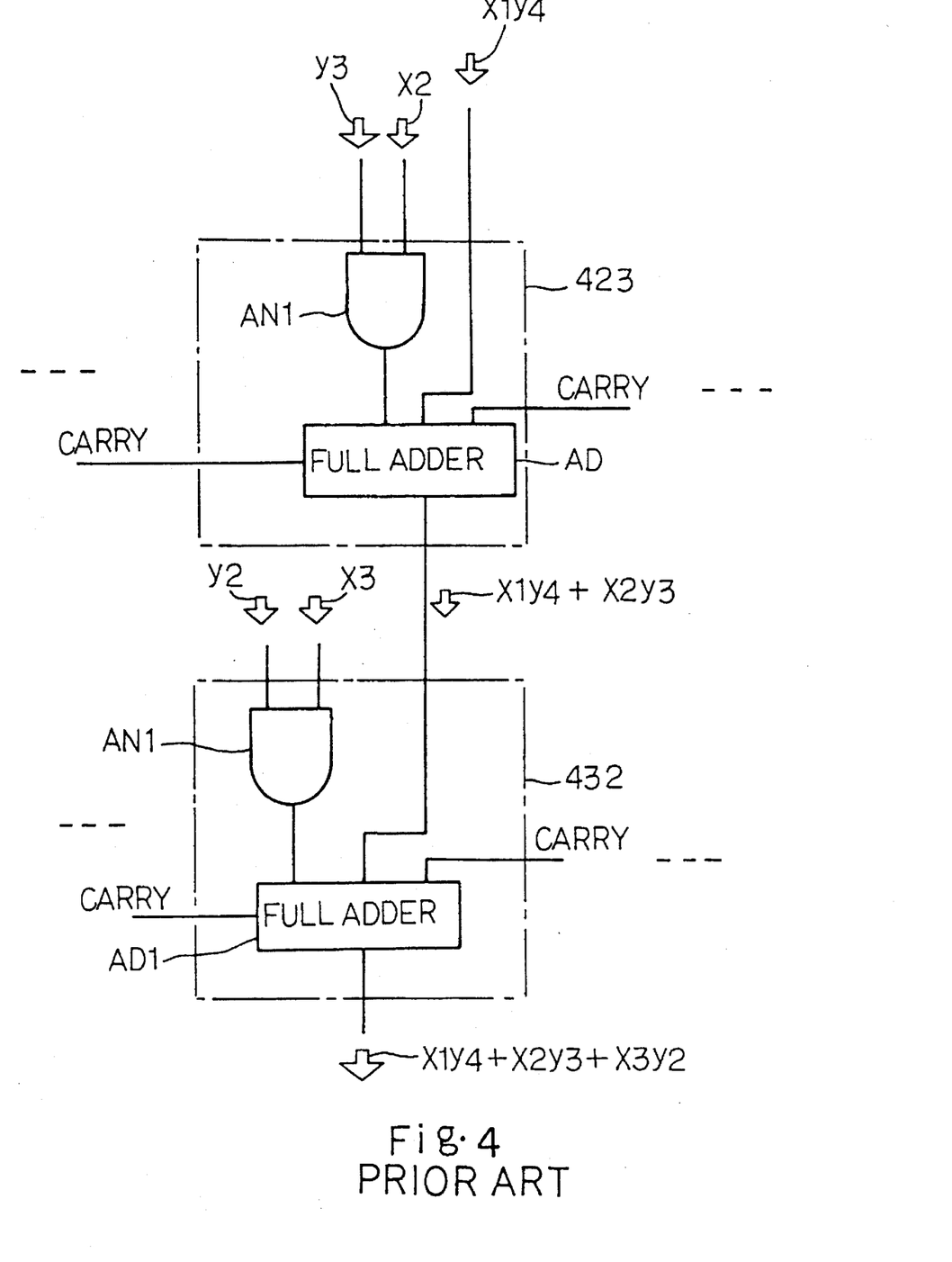
FIG. 4 is a circuit diagram showing the arrangement of the calculation sub-units forming parts of the arithmetic unit.

Each calculating sub-unit has the AND gate AN1 and the adder AD1 as shown in FIG. 4. One of the bits x1 to x4 is ANDed with one of the bits y1 to y4, and the partial product $x_i y_j$ (where i is 1, 2, 3 or 4 and j is also 1, 2, 3 or 4) is added to another partial product supplied from the previous row and a carry bit supplied from the right adder of the same row.

The arithmetic unit 4 outputs the true product represented by a positive number, and a sign bit should be given to the true product. In order to give the sign bit, the sign discriminating unit 3 examines the most significant bits of the twos complements. According to the twos complement representation, the most significant bit of "0" is indicative of a positive value, and the most significant bit of "1" represents a negative value. The sign bit of the true product is determined by an exclusive-OR gate operative on the most significant bit of the multiplicand and the most significant bit of the multiplier, and the converter 5 form the true product in the twos complement representation through the sequence carried out in the absolutizing units 1 and 2. Namely, if the true product is a positive value, the converter 5 transfers the bit string without any treatment. On the other hand, if the sign discriminating unit 3 reports that the true product has a negative value, all of the bits are inverted, and value "1" is added to the least significant bit. Thus, the converter 5 outputs the true product in the twos complement representation.

The prior art digital multiplier encounters a problem in that a large number of calculating sub-units 411 to 444 are required for the arithmetic unit 4. If the multiplicand and the multiplier are 5-bit digital codes, the arithmetic unit 4 needs twenty-five calculating sub-units. In case of a multiplication on 8-bit digital codes, the arithmetic unit 4 needs sixty-four calculating sub-units.

Another problem inherent in the prior art digital multiplier is a low calculation speed.

SUMMARY OF THE INVENTION

It is therefore an important object of the present invention to provide a high-speed digital multiplier which is decreased in circuit component.

The present inventor contemplated the problems inherent in the prior art digital multiplier, and noticed that all the bits were not evenly weighted in the multiplication.

In detail, the true product was represented by the total number of the bits indicative of the multiplicand and the bits indicative of the multiplier. For example, if the multiplicand and the multiplier were 5 bits, the product was represented by a 10-bit digital code. If the multiplicand and the multiplier were 8 bits, the true product was represented by 16 bits. However, the uppermost two bits of the true product were matched with the sign bit given thereto, and the most significant bit of the multiplicand and the most significant bit of the multiplier were valid only in the multiplication between the multiplicand with the maximum negative value and the multiplier with the maximum negative value. In case of the other multiplications, the true products could be expressed by the product between the {(the number of the bits of the multiplicand)−1} and {(the number of the bits of the multiplier)−1} accompanied with the two sign bits, because only the maximum negative value has the most significant bit of "1" through the absolutization.

The present inventor concluded that the true product was obtained without calculation between the higher bits except for the multiplication between the multiplicand and the multiplier both representing the maximum negative value and that the second bit from the most significant bit was set to "1" for the multiplication between the multiplic-and and the multiplier both representing the maximum negative value and to "0" for the other multiplications.

To accomplish the object, the present invention proposes to multiply lower bits of a multiplicand by lower bits of a multiplier except for the maximum negative values.

In accordance with the present invention, there is provided a digital multiplier supplied with a first multi-bit data code indicative of a multiplicand and a second multi-bit data code indicative of a multiplier, the first multi-bit data code and the second multi-bit data code representing the multiplicand and the multiplier in the twos complement representation, comprising: a) a first absolutizing unit operative to absolutize the multiplicand represented by a third multi-bit data code smaller in the number of bits than the first multi-bit data code; b) a second absolutizing unit operative to absolutize the multiplier represented by a fourth multi-bit data code smaller in the number of bits than the second multi-bit data code; c) an arithmetic unit operative to multiply the multiplicand represented by the third multi-bit data code by the multiplier represented by the fourth multi-bit data code for producing a product represented by a fifth multi-bit data code without a sign bit, the fifth multi-bit data code being divided into lower bits and higher bits; d) a sign generating means operative to determine whether or not both of the multiplicand and the multiplier have the respective maximum negative values and whether or not at least one of the multiplicand and the multiplier is zero, and producing sign bits depending upon the determinations thereof; and e) a converting unit operative to produce a sixth multi-bit data code indicative of the product in the twos complement representation from either higher or corrective bits, lower bits and the sign bits.

BRIEF DESCRIPTION OF THE DRAWINGS

The features and advantages of the digital multiplier according to the present invention will be more clearly understood from the following description taken in conjunction with the accompanying drawings in which.

DESCRIPTION OF THE PREFERRED EMBODIMENTS

First Embodiment

Figure 5:
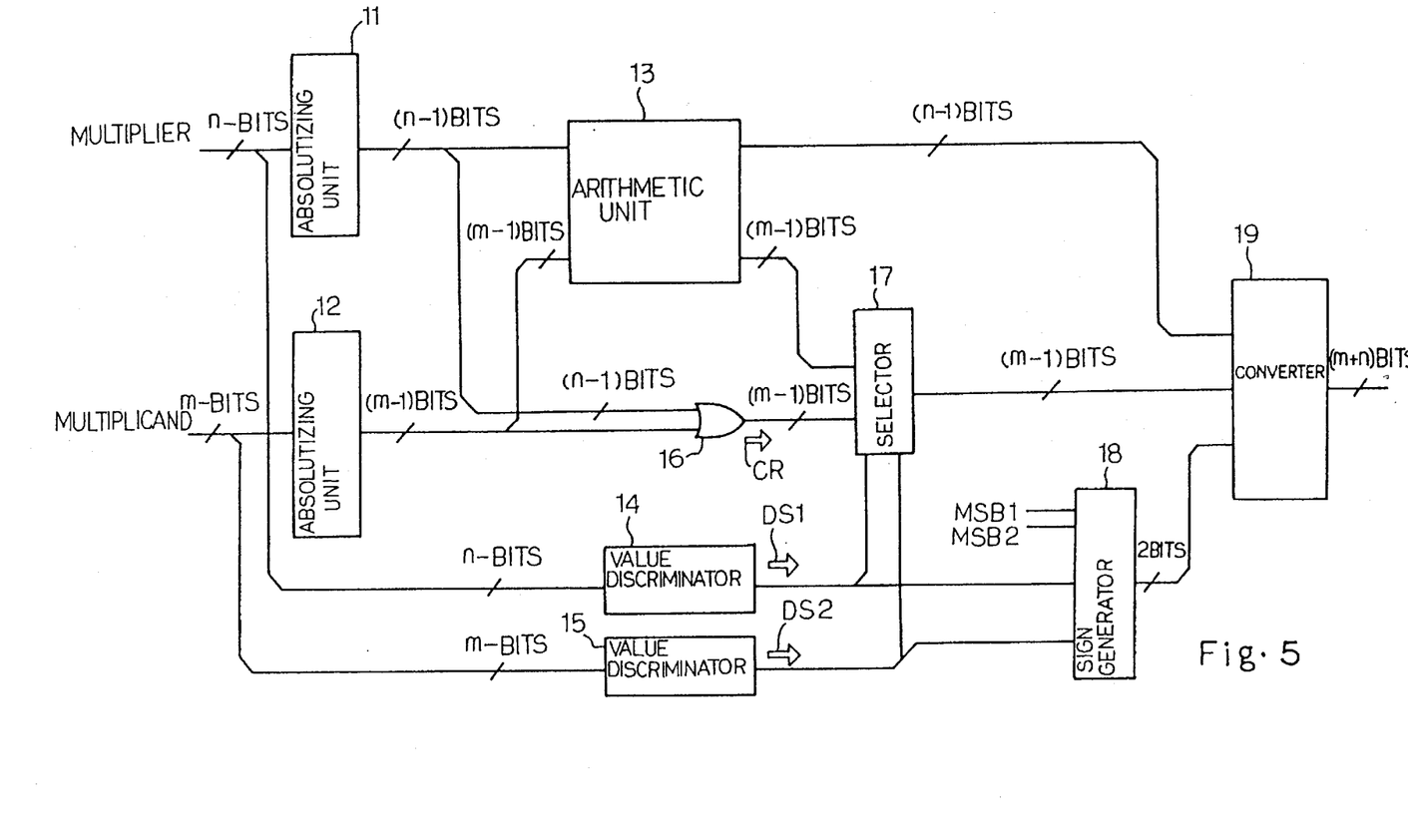
FIG. 5 is a block diagram showing the arrangement of a digital multiplier according to the present invention.

Referring to FIG. 5 of the drawings, a digital multiplier embodying the present invention comprises absolutizing units 11 and 12, an arithmetic unit 13, value discriminators 14 and 15, a data corrector 16, a data selector 17, a sign generator 18, and a converter 19. These component circuits 11 to 19 are described hereinbelow in detail. In the following description, m bits are assumed to be larger in figures than n bits.

A multiplier is supplied to the absolutizing unit 11, and the absolutizing unit 11 converts an n-bit data code indicative of the multiplier from the twos complement representation to the absolutized representation. In the conversion, the most significant bit is deleted from the n-bit data code, and, accordingly, the absolutized multiplier is represented by an (n−1) bit data code. The conversion process is similar to that of the prior art, and no further description is incorporated hereinbelow for avoiding repetition.

A multiplicand is supplied to the absolutizing unit 12, and the absolutizing unit 12 converts an m-bit data code from the twos complement representation to the absolutized representation. In the conversion, the most significant bit is deleted from the m-bit data code, and the absolutized multiplicand is represented by an (m−1) bit data code. The absolutizing process is also similar to that of the prior art process.

The arithmetic unit 13 is implemented by calculating sub-units arranged similar to the prior art arithmetic unit 4, and the calculating sub-units are identical in circuit arrangement with the calculating sub-unit illustrated in FIG. 4. However, the number of the calculating sub-units are smaller than the calculating sub-units forming in combination the prior art arithmetic unit 4 by (2n−1), because the most significant bits are deleted from the multiplicand and the multiplier. The arithmetic unit 13 multiplies the absolutized multiplicand by the absolutized multiplier for producing a true product, and the true product is represented by (n−1) lower order bits and (m−1) higher order bits.

The n-bit data code indicative of the multiplier is supplied to the value discriminator 14, and the value discriminator 14 is operative to determine whether the multiplier represents zero, the maximum negative value or the other values, i.e., a value except for zero and the maximum negative value. The value discriminator 14 produces a first discriminating signal DS1, and the first discriminating signal DS1 is supplied to the data selector 17 and the sign generator 18.

The m-bit data code indicative of the multiplicand is supplied to the value discriminator 15, and the value discriminator 15 is operative to determine whether the multiplicand represents zero, the maximum negative value or the other values. The value discriminator 15 produces a second discriminating signal DS2, and the second discriminating signal DS2 is also supplied to the data selector 17 and the sign generator 18.

The (n−1) bit data code and the (m−1) bit data code are supplied from the absolutizing units 11 and 12 to the data corrector 16. If one of the multiplier and the multiplicand has the maximum negative value, the absolutized multiplier/absolutized multiplicand is represented by zero, and the multiplication results in the true product of zero. However, the true product is not correct. In order to prevent the arithmetic unit 13 from producing the incorrect result, the data corrector 16 produces an (m−1) bit corrective data code CR, and supplies the (m−1) bit corrective data code CR to the data selector 17. The (m−1) bit corrective data code CR is indicative of upper (m−1) bits of a value $2^{(n-1)}$ times larger than the value indicated by the (m−1) bit data code in case where the multiplier has the maximum negative value. On the other hand, if the multiplicand has the maximum negative value, the (m−1) bit corrective data code CR is indicative of upper (m−1) bits of a value $2^{(m-1)}$ times larger than the value indicated by the (n−1) bit data code in case where the multiplicand has the maximum negative value. The data selector 17 is responsive to the first and second discriminating signals DS1 and DS2 for selectively transferring the (m−1) higher order bits and the (m−1) bit corrective data code CR to the converter 19. The first and second discriminating signals DS1 and DS2, the most significant bit MSB1 of the m-bit data code and the most significant bit MSB2 of the n-bit data code are supplied to the sign generator 18, and the sign generator 18 determines either positive or negative sign for the true product. Namely, if one of the multiplicand and the multiplier is zero, the sign generator 18 supplies bits "00" to the converter 19. If both of the multiplicand and the multiplier have the maximum negative values, the sign generator 18 supplies bits "10" to the converter 19. However, the most significant bit MSB1 is exclusive-ORed with the most significant bit MSB2 for the other combinations, and the result indicated by two bits is supplied to the converter 19. The (n−1) lower order bits, the (m−1) bit data code supplied from the data selector 17 and the two bit sign code are supplied to the converter 19, and the converter 19 converts the true product to the twos complement representation. The converting process is similar to that of the prior art, and an (m+n) bit data code indicative of the true product is delivered from the converter 19. The data corrector 16, the data selector 17 and circuit components of the value discriminators 14 and 15 related to the selection of the data selector 17 may be deleted from the digital multiplier.

Second Embodiment

Figure 6:
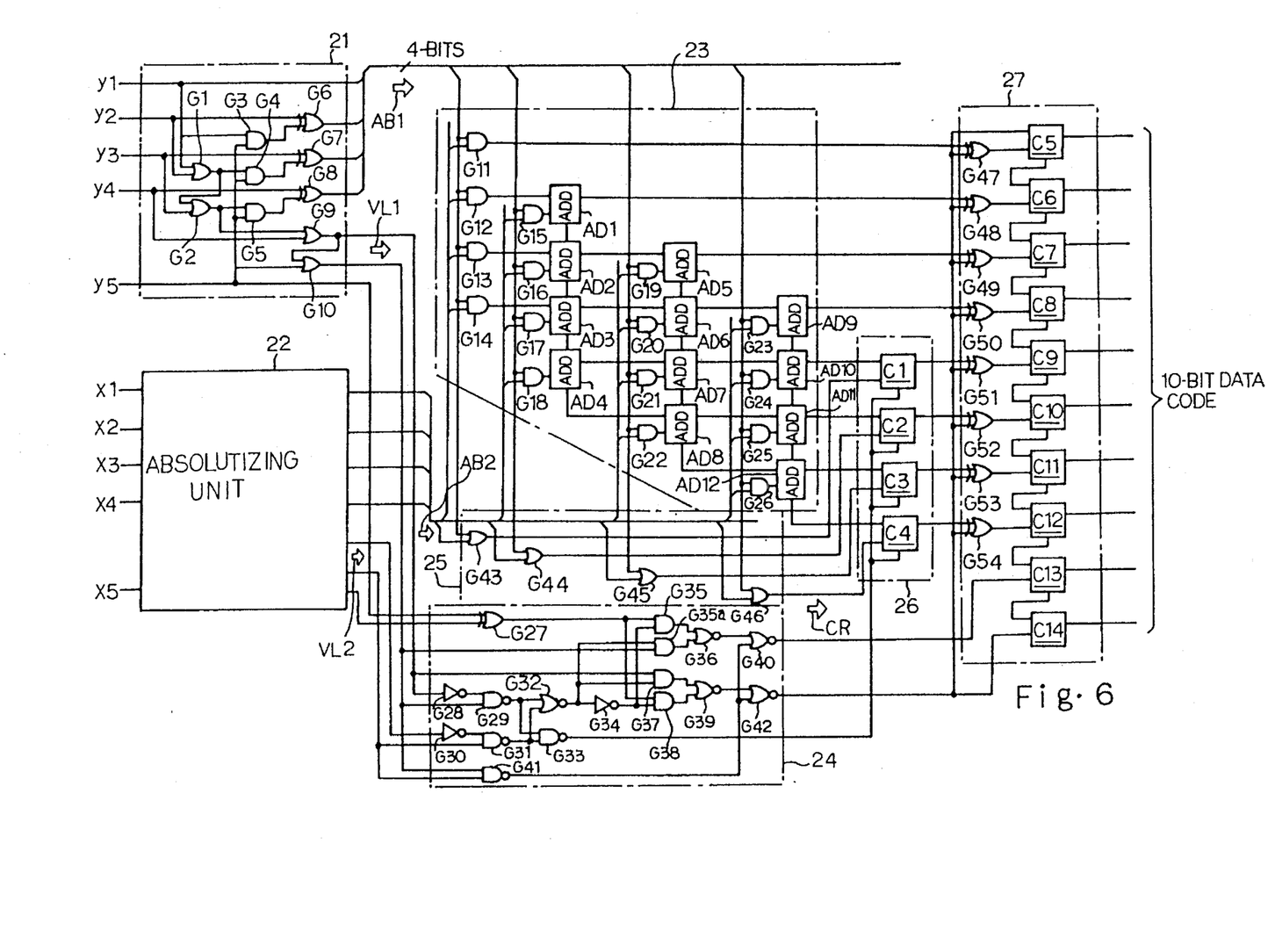
FIG. 6 is a logic diagram showing the arrangement of a digital multiplier shown in FIG. 5.

Turning to FIG. 6 of the drawings, a digital multiplier embodying the present invention comprise two absolutizing units 21 and 22, an arithmetic unit 23, a value discriminator/sign generator 24, a data corrector 25, a data selector 26 and a converter 27. The digital multiplier multiplies a 5-bit code x5 x4 x3 x2 x1 indicative of a multiplicand by a 5-bit data code y5 y4 y3 y2 y1 indicative of a multiplier. A part of the value discrimination is carried out by the absolutizing units 21 and 22.

Logic gates G1 to G10 form the absolutizing unit 21, and the other absolutizing unit 22 is also implemented by logic gates (not shown) identical with the logic gates G1 to G10. The arithmetic unit 23 comprises logic gates G11 to G26 and adders AD1 to AD12, and the value discriminator/sign generator 24 is constituted by logic gates G27 to G42. The logic gates G27/G34/G35/G35a/G36/G37/G38/G39/G40/G41/G42 form in combination a sign generating section. The adders AD1, AD5, AD9 are half adders, and the other adders AD2 to AD4, AD6 to AD8 and AD10 to AD12 are full-adders. Logic gates G43 to G46 form the data corrector 25, and the data selector 26 is formed by four component circuits C1 to C4. Logic gates G47 to G54 and component circuits C5 to C14 as a whole constitute the converter/sign generator 27. In the following description, a bit of a digital code is labeled with the same reference as a logic gate which produces the bit.

Assuming now that the 5-bit data code x5 x4 x3 x2 x1 and the 5-bit data code y5 y4 y3 y2 y1 are respectively supplied to the absolutizing units 21 and 22, the bits x5 and y5 are the most significant bits each indicative of either positive or negative sign, and the bits x1 and y1 are the least significant bits. Since the least significant bits x1 and y1 are unchanged through the absolutization, the least significant bits x1 and y1 pass through the absolutizing units 21 and 22 without any treatment. The other bits of the multiplicand are treated similar to the other bits of the multiplier, and, for this reason, description is focused on the absolutizing unit 21 only.

The data bit y2 is exclusive-ORed with the logic product between the most significant bit y5 and the least significant bit y1. If the most significant bit y5 is "0" indicative of the positive sign, the logic product is "0", and the exclusive-OR gate G6 yields the bit identical with the bit y2. On the other hand, if the most significant bit y5 is "1" indicative of the negative sign, the logic product is dependent on the least significant bit y1. If the least significant bit y1 is "0", the logic product is "0", and the exclusive-OR gate G6 determines the output bit to be identical with the bit y2. On the other hand, if the least significant bit y1 is "1" the logic product is "1" and the exclusive-OR gate G6 inverts the logic level of the bit y2.

The other bits y3 and y4 are similarly treated by the absolutizing unit 21. Namely, the low-order bits are ORed with one another for the bit y3 and y4, and the logic sum is ANDed with the most significant bit y5. If no "1" bit is detected, the exclusive-OR gate G7 or G8 yields the output bit identical with the bit y3 or y4. On the other hand, if the most significant bit y5 is indicative of the negative sign and the lower order bits contain "1" bit, the exclusive-OR gate G7 or G8 inverts the bit y3 or y4.

In this way, 4-bit data bits AB1 indicative of the absolutized multiplier are produced by the absolutizing unit 21, and distributed to the rows of logic gates G11-G14/G15-G18/G19-G22/G23-G26.

The OR gates G9 and G10 produce a 2-bit code VL1 indicative of one of three categories where the value of the 5-bit data code y1-y5 belongs. If the 5-bit data code is 00000, the 2-bit code is 00. If the 5-bit data code is 10000 indicative of the maximum negative value, the 2-bit code is 10. The 2-bit code is 11 for the other values.

The other absolutizing unit 22 also produces a 4-bit data code AB2 indicative of the absolutized multiplicand and a 2-bit code VL2 in a similar process to the absolutizing unit 21. The bits of the 4-bit data code AB2 and the bits of the 2-bit code are labeled with like references designating the corresponding logic gates of the absolutizing unit 21.

The 2-bit codes VL1 and VL2 and the most significant bits y5 and x5 are supplied from the absolutizing units 21 and 22 to the value discriminator/sign generator 24, and the 4-bit data codes AB1 and AB2 are supplied from the absolutizing units 21 and 22 to the arithmetic unit 23 and the data corrector 25.

The least significant bit of the 4-bit data code AB1 is ANDed with the four bits of the data code AB2 for producing partial products, and the second bit G6 of the 4-bit data code AB1 is ANDed with the four bits of the data code AB2 for producing partial products. Similarly, the third bit G7 of the data code AB1 is ANDed with the four bits of the data code AB2 for producing partial products, and the highest bit G8 of the data code AB1 is ANDed with the four bits of the data code AB2 for producing partial products. The partial products are labeled with the references designating the logic gates which produce them.

The AND gate G11 yields the least significant bit of an 8-bit data code indicative of a true product, and the half-adder AD1 yield the second bit of the 8-bit data code as a sum of the partial products G12 and G15. Moreover, the third bit of the 8-bit data code is produced by the half adder AD5 from the partial product G19, the sum of the partial products G13 and G16 and a carry bit supplied from the half-adder AD1. The fourth bit of the 8-bit data code is produced by the half adder AD9 from the partial product G23 and the sum of the partial products G14, G17 and G20 and carry bits supplied to the adders AD3 and AD6. The fifth bit of the 8-bit data code is produced by the full adder AD10 from the partial product G24 and the sum of the partial products G18 and G21 and carry bits supplied to the adders AD4, AD7 and AD10. The sixth bit of the 8-bit data code is produced by the full adder AD11 from the partial product G25 and the sum of the partial product G22 and carry bits supplied to the adders AD8 and AD11. The seventh bit of the 8-bit data code is produced by the full adder AD12 from the partial product G26, carry bits supplied from the adders AD8 and AD11 and the eighth bit is the carry bit of the full adder AD12.

The least significant bit of the 4-bit data code AB1 is ORed with the least significant bit of the 4-bit data code AB2, and the other bits G6, G7 and G8 of the 4-bit data code AB1 are respectively ORed with the other bits G6', G7' and G8' of the 4-bit data code AB2, respectively. The four bits G43, G44, G45 and G46 of a corrective data code CR are respectively distributed to the component circuits C1 to C4 of the data selector 26, and the fifth to eighth bits of the 8-bit data code are further supplied to the other input nodes of the component circuits C1 to C4, respectively.

The least significant bit and the second to fourth bits of the 8-bit data code are directly supplied to the converter 27, and the component circuits C1 to C4 selectively transfer the fifth to eighth bits of the 8-bit data code and the four bits G43 to G46 of the corrective data code CR to the converter 27.

The output signal of the NAND gate G33 controls the data selector 26, and the data selector 26 is responsive to the output signal G33 for the selection between the fifth to eighth bits and the corrective data code CR.

The complementary bit of the bit G9 is NANDed with the bit G10, and the NAND gate G29 yields the output signal of "0" only when the 5-bit data code y1 to y5 has the maximum negative value. Similarly, the complementary bit of the bit G9' is NANDed with the bit G10', and the NAND gate G31 produces the output signal of "0" only when the 5-bit data code x1 to x5 has the maximum negative value. The output signals G29 and G31 are supplied to the NAND gate G33, and the NAND gate G33 produces the output signal of "1" if one of the multiplicand and the multiplier has the maximum negative value. If the output signal G33 is "1", the data selector 26 transfers the corrective data code CR to the converter/sign generator 27. On the other hand, if the output signal G33 is "0", the fifth to eighth bits are transferred to the converter/sign generator 27.

The output signals G29 and G31 and the bits are further supplied to the NOR gate G32, and the bits G10/G10+ are supplied to the NAND gate G41. The sign generating section G27/G34 to G42 determines sign bits to be added to the 8-bit data code. Namely, if the output signal G32 is "1", the multiplicand and the multiplier have the maximum negative values, respectively, and the NOR gates G39 and G36 yield the output signals "1" and "0" identical with the 2-bit code VL1. On the other hand, when at least one of the multiplicand and the multiplier does not have the maximum negative value, the exclusive-OR gate G27 dominates the sign generation, and the NOR gates G39 and G36 yield the output signals of "11" for a negative true product or "00" for a positive true product.

If at least one of the multiplicand and the multiplier is 00000, the bit G10 is NANDed with the bit G10', and the NAND gate G41 yields the output signal of "1". This results in that the NOR gates G40 and G42 yields the sign bits of "00". If both multiplicand and multiplier are not 00000, the NOR gates G40 and G42 produce the sign bits from the output signals G36 and G39.

The sign bits G40 and G42 are supplied to the component circuits C13 and C14, and are indicative of either positive or negative sign for the true product in the twos complement representation. The sign bit G42 is further supplied to the exclusive-OR gates G47 to G54. If the true product is to be a negative value, the exclusive-OR gates G47 to G54 invert the bits partially supplied from the arithmetic unit 23 and partially supplied from the data selector 26, and the output bits G47 to G54 form the 10-bit data code indicative of the true product in the twos complement representation together with the two sign bits G40 and G42. On the other hand, if the true product is to be a positive value, the exclusive-OR gates G47 to G54 transfer the input bits, and the output bits G47 to G54 form the 10-bit data code together with the sign bits G40 and G42.

As will be appreciated from the foregoing description, a smaller number of adders form an arithmetic unit incorporated in the digital multiplier according to the present invention, and the digital multiplier is smaller than the prior art digital multiplier. Moreover, the 8-bit data code is rapidly determined, because the carry bits are smaller than those of the prior art. This results in speed-up of the multiplication.

Although particular embodiments of the present invention have been shown and described, it will be obvious to those skilled in the art that various changes and modifications may be made without departing from the spirit and scope of the present invention. For example, the digital multiplier according to the present invention may form a part of a large scale integration such as a micro-processor or a microcomputer.

What is claimed is:

1. A digital multiplier supplied with a first multi-bit data code and a second multi-bit data code, said first multi-bit data code and said second multi-bit data code respectively representing a primary multiplicand and a primary multiplier in the twos complement representation, said digital multiplier comprising:

a first absolutizing unit for absolutizing said primary multiplicand for producing a secondary multiplicand represented by a third multi-bit data code smaller in the number of bits than said first multi-bit data code;

a second absolutizing unit for absolutizing said primary multiplier for producing a secondary multiplier represented by a fourth multi-bit data code smaller in the number of bits than said second multi-bit data code;

sign generating means for determining whether both of said primary multiplicand and said primary multiplier have the respective maximum negative values for making a first decision and whether at least one of said primary multiplicand and said primary multiplier is zero for making a second decision, and producing a decision signal representing said first decision and said second decision, said sign generating means being further for producing a sign signal indicative of a sign for a product on the basis of said decision signal;

arithmetic means connected to said first absolutizing unit and said second absolutizing unit for multiplying said secondary multiplicand by said secondary multiplier for producing a preliminary product represented by lower bits and higher bits without a sign bit, said arithmetic means further producing corrective bits from said secondary multiplicand and said secondary multiplier, said corrective bits corresponding to said higher bits and being indicative of a correct value when one of said primary multiplicand and said primary multiplier has said maximum negative value, said arithmetic means further being connected to said sign generating means so as to be responsive to said decision signal for outputting said lower and higher bits as a fifth multi-bit data code representative of said product when said primary multiplicand and said primary multiplier do not have said maximum negative values, respectively, said arithmetic means replacing said higher bits with said corrective bits for modifying said fifth multi-bit data code when at least one of said primary multiplicand and primary multiplier has the maximum negative value; and a converting unit, connected to said arithmetic unit and said sign generating means, for producing a sixth multi-bit data code indicative of said product with said sign in the twos complement representation on the basis of said fifth multi-bit data code and said sign bits.

2. A digital multiplier as set forth in claim 1, in which said arithmetic means comprises:

an arithmetic unit for multiplying said secondary multiplicand by said secondary multiplier for producing said preliminary product without a sign, a data corrector connected to said first absolutizing unit and said second absolutizing unit for producing said corrective bits for said higher bits on the basis of said secondary multiplicand and the number of bits of said secondary multiplier and the number of bits of said secondary multiplicand; and a data selector responsive to said decision signal representing that one of said primary multiplicand and said primary multiplier has said maximum negative value for replacing said higher bits with said corrective bits.

3. A digital multiplier as set forth in claim 1, in which said arithmetic unit comprises:

rows of logic gates selectively supplied with the bits of said secondary multiplicand and the bits of said secondary multiplier for producing partial products, each row of logic gates being offset by one logic gate from a previous row of logic gates; and rows of adders associated with said rows of logic gates except for the row of logic gates supplied with the least significant bit of said secondary multiplier, each of said adders being operative to add the sum supplied from one of the adders in the previous row and a carry supplied from one of the adders of the same row to the partial product supplied from the associated logic gate.

4. A multiplier comprising:

an input data treating portion supplied with a first data and a second data for producing a third data and a fourth data both smaller in the number of bits than said first data and said second data, respectively, through an absolutizing operation on said first data and said second data;

a processing portion connected to said input data treating portion, and for multiplying said third data and said fourth data for producing a fifth data indicative of a higher digit portion of a product without a sign and a sixth data indicative of a lower digit portion of said product;

a corrected data outputting portion, connected to said input data treating portion, for producing a corrected data replaceable with said higher digit portion on the basis of said third data and the number of bits of said fourth data or said fourth data and the number of bits of said third data;

a sign determining portion supplied with said first data and said second data for producing a seventh data containing sign information of said product and a decision signal indicating whether one of said first data and said second data has the maximum negative value, a correcting portion connected to said processing portion, said corrected data outputting portion and said sign determining portion, and supplied with said decision signal, said corrected data and said fifth data for replacing said fifth data with said corrected data when said decision signal indicates that one of said first data and said second data has the maximum negative value; and an output portion connected with said processing portion, said correcting portion and said sign determining portion, and supplied with said sixth data, said seventh data and one of said fifth data and said corrected data for forming said product between said first data and said second data.

* * * * *